(12) United States Patent
Lee et al.

(10) Patent No.: US 10,907,667 B2
(45) Date of Patent: Feb. 2, 2021

(54) BAFFLE DEVICE FOR IMPROVING FLOW DEVIATION OF FLUID

(71) Applicant: LG CHEM, LTD., Seoul (KR)

(72) Inventors: Junyoung Lee, Daejeon (KR); Jun Won Choi, Daejeon (KR); Chang Hun Yu, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 19 days.

(21) Appl. No.: 16/461,257

(22) PCT Filed: Jan. 17, 2018

(86) PCT No.: PCT/KR2018/000808
§ 371 (c)(1),
(2) Date: May 15, 2019

(87) PCT Pub. No.: WO2018/216878
PCT Pub. Date: Nov. 29, 2018

(65) Prior Publication Data
US 2019/0316612 A1 Oct. 17, 2019

(30) Foreign Application Priority Data
May 24, 2017 (KR) .................. 10-2017-0064189

(51) Int. Cl.
*F15D 1/02* (2006.01)
*F15D 1/00* (2006.01)
*B01D 53/94* (2006.01)

(52) U.S. Cl.
CPC ....... *F15D 1/0005* (2013.01); *B01D 53/9431* (2013.01)

(58) Field of Classification Search
CPC ..................................................... F15D 1/005
(Continued)

(56) References Cited

U.S. PATENT DOCUMENTS 1,940,790 A 12/1933 Diehl
2,662,553 A * 12/1953 Dimmock ................ F15D 1/04
138/37
(Continued)

FOREIGN PATENT DOCUMENTS

CN 2075277 U 4/1991
CN 1112995 A 12/1995
(Continued)

*Primary Examiner* — James F Hook
(74) *Attorney, Agent, or Firm* — Dentons US LLP

(57) ABSTRACT

A baffle apparatus for improving a flow deviation of a fluid due to the enlargement of a flow cross-section of the fluid including a plurality of baffle members. Each of the plurality of baffle members has a first part into which the fluid enters and a second part from which the fluid flows out, the first part and the second part are integrated, the first part of each of the plurality of baffle members is at a position where the flow cross-section of the fluid is enlarged and the second part of each of the plurality of baffle members is at the position where the flow cross-section of the fluid is constant, and ends of the first parts are spaced apart from each other by a distance satisfying the equation:

$$d_i = \frac{D}{f(i)\sum_{i=1}^{n}\frac{1}{f(i)}},$$

and the second parts are spaced apart from each other by a uniform distance.

6 Claims, 4 Drawing Sheets

(58) Field of Classification Search
USPC .................................................. 138/39, 42
See application file for complete search history.

(56) References Cited

U.S. PATENT DOCUMENTS

| | | | | |
|---|---|---|---|---|
| 3,831,350 | A | * | 8/1974 | Gilles ............... F16L 55/02718 |
| | | | | 96/62 |
| 5,099,879 | A | | 3/1992 | Baird |
| 5,266,007 | A | * | 11/1993 | Bushnell ............... F04D 29/283 |
| | | | | 416/178 |
| 5,531,484 | A | | 7/1996 | Kawano |
| 6,158,954 | A | * | 12/2000 | Nabeshima ........... F04D 29/283 |
| | | | | 415/119 |
| 6,290,266 | B1 | | 9/2001 | Kawano |
| 6,905,658 | B2 | | 6/2005 | Rogers et al. |
| 8,784,740 | B2 | | 7/2014 | Wada et al. |
| 9,394,825 | B2 | | 7/2016 | Dziubinschi et al. |
| 2005/0224179 | A1 | | 10/2005 | Moon et al. |

FOREIGN PATENT DOCUMENTS

| | | |
|---|---|---|
| CN | 2793392 Y | 7/2006 |
| CN | 102132096 A | 7/2011 |
| CN | 101218019 B | 11/2011 |
| CN | 204286196 U | 4/2015 |
| DE | 1227290 B | 10/1966 |
| DE | 102006058715 B3 | 1/2008 |
| EP | 0940585 A1 | 9/1999 |
| EP | 1454780 A2 | 9/2004 |
| EP | 2543433 A1 | 1/2013 |
| EP | 3059409 A1 | 8/2016 |
| JP | 2005-526395 A | 9/2005 |
| JP | 2013-133805 A | 7/2013 |
| KR | 10-1999-0072536 A | 9/1999 |
| KR | 10-2002-0094213 A | 12/2002 |
| KR | 10-2003-0003045 A | 1/2003 |
| KR | 10-0430282 B1 | 5/2004 |
| KR | 10-2004-0078069 A | 9/2004 |
| KR | 10-2013-0030388 A | 3/2013 |
| KR | 10-2015-0116366 A | 10/2015 |
| KR | 10-2016-0149383 A | 12/2016 |
| KR | 10-2017-0024312 A | 3/2017 |
| WO | 03/098669 A1 | 11/2003 |
| WO | 2006/110458 A1 | 10/2006 |

\* cited by examiner

[FIG. 1a]
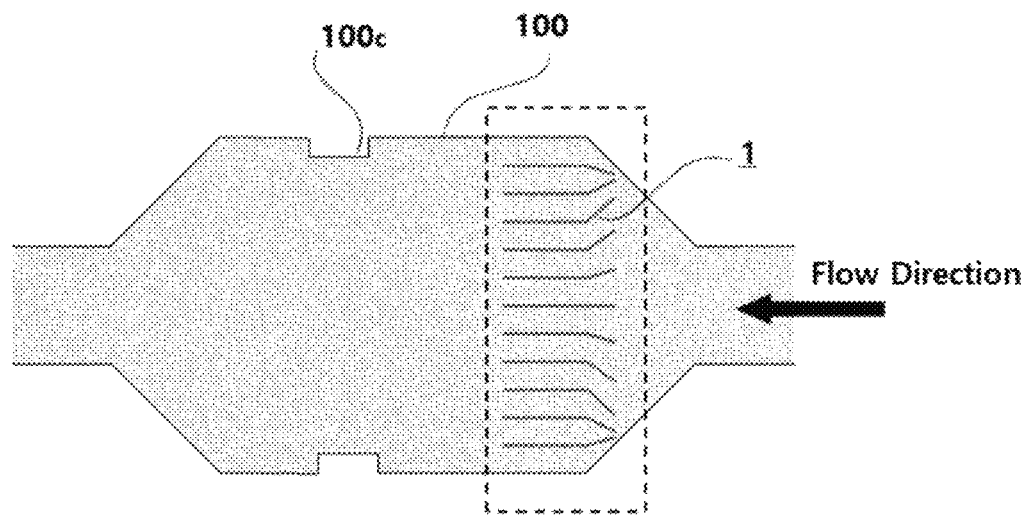
[FIG. 1b]
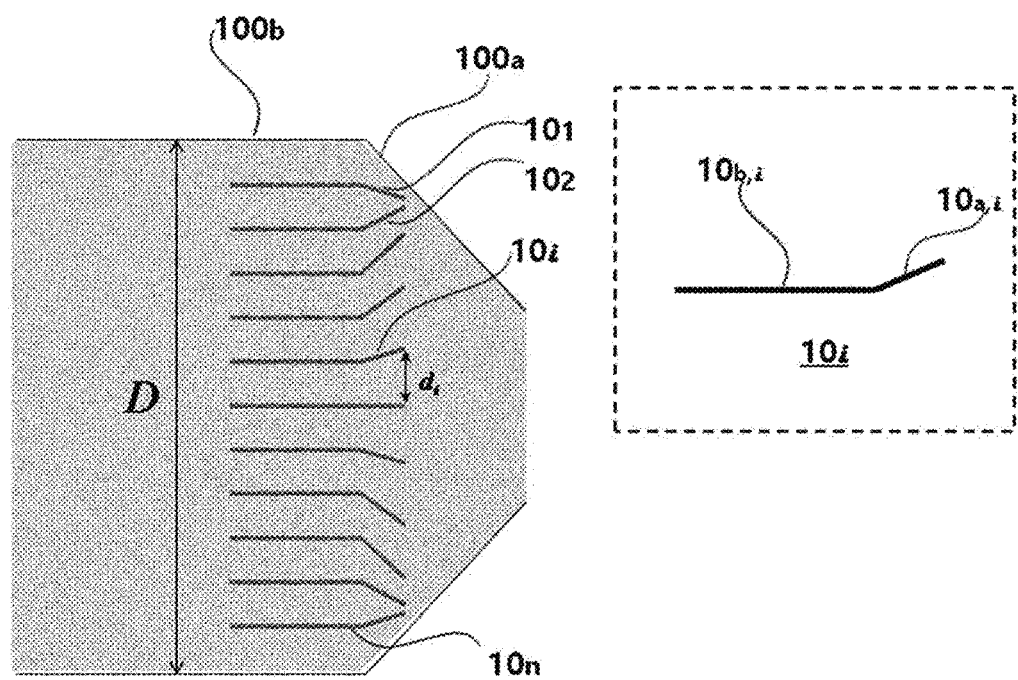

[FIG. 1c]
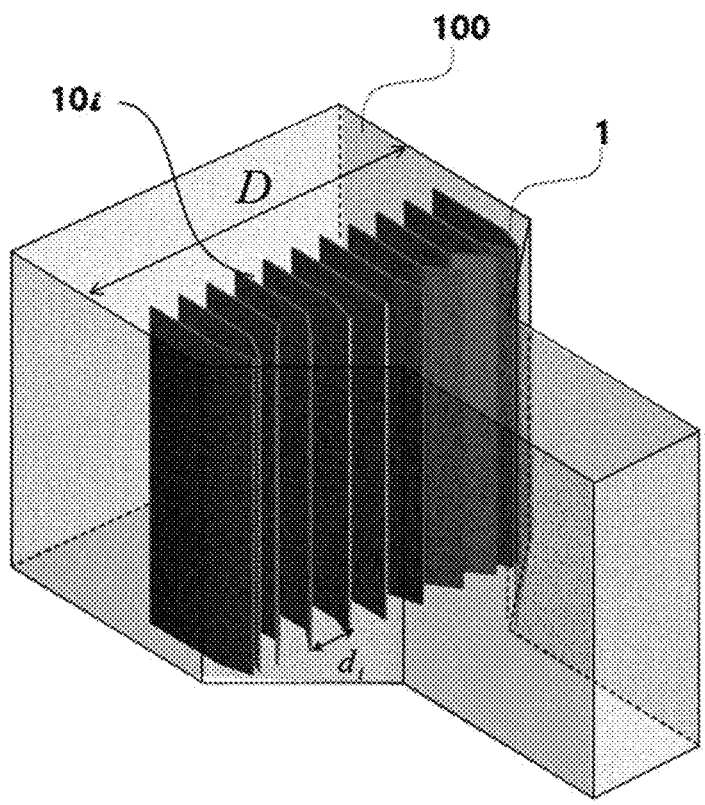
[FIG. 2a]
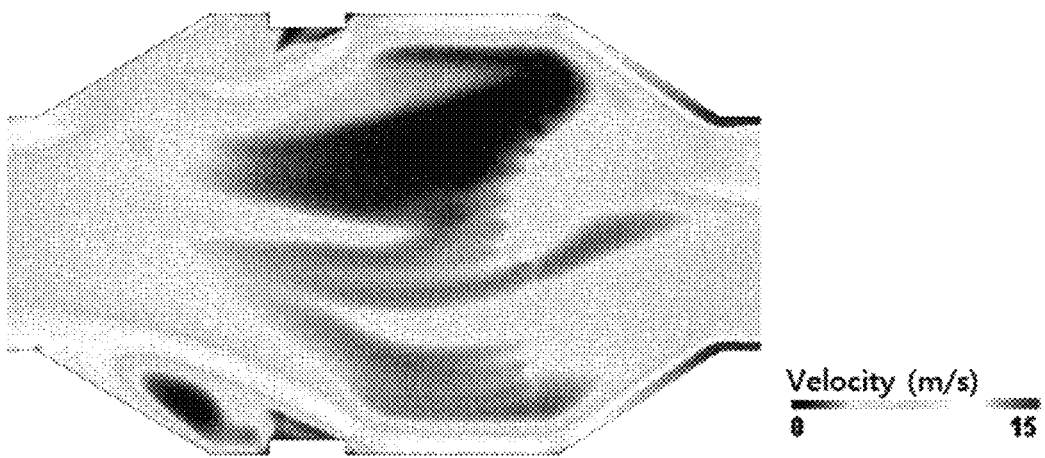

[FIG. 2b]
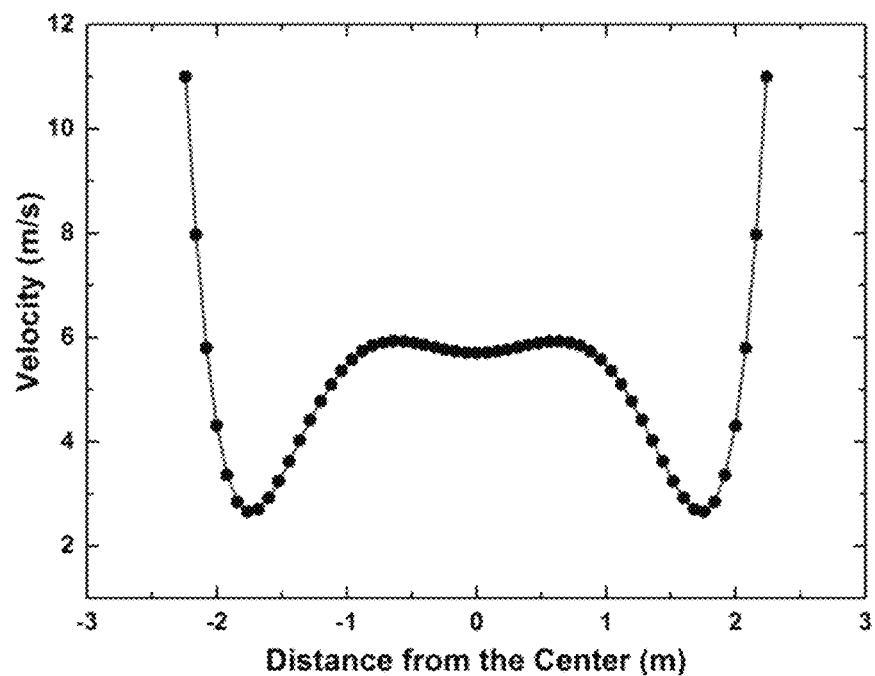
[FIG. 2c]
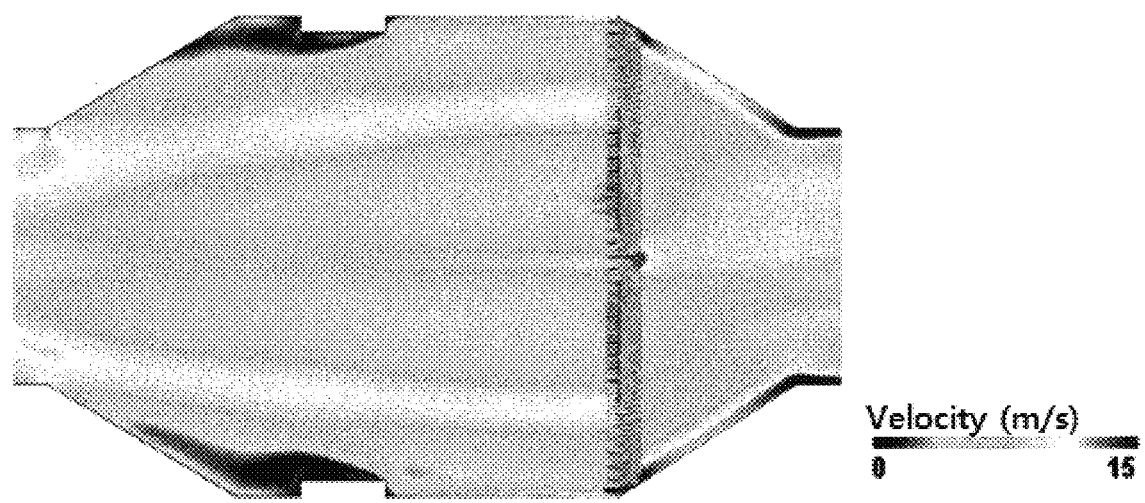

[FIG. 3a]
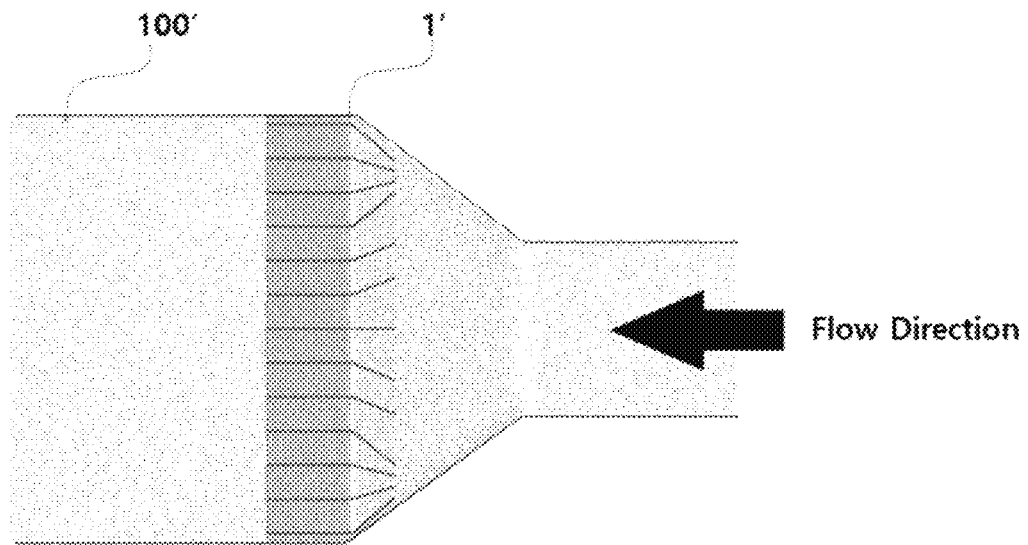
Flow Direction
[FIG. 3b]
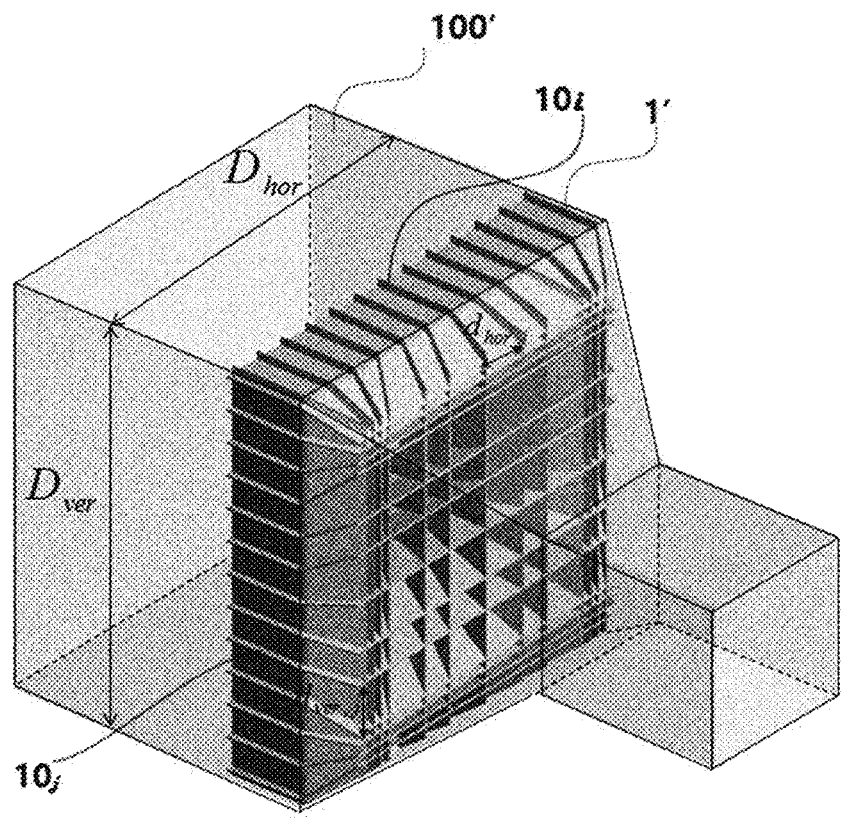

BAFFLE DEVICE FOR IMPROVING FLOW DEVIATION OF FLUID

CROSS-REFERENCE TO RELATED APPLICATIONS

This application is the U.S. national stage of international application No. PCT/KR2018/000808 filed Jan. 17, 2018, and claims the benefit of priority to Korean Patent Application No. 10-2017-0064189, filed on May 24, 2017, the entire disclosures of which are incorporated herein by reference.

TECHNICAL FIELD

The present invention relates to a baffle apparatus for improving a flow deviation of fluid, more particularly for controlling a flow deviation of fluids in a pipe or various apparatus.

BACKGROUND ART

In generally, a flow deviation of fluids in a pipe or various apparatus is important in determining the performance of such apparatus. In order to improve the flow deviation, it is conventional to design a baffle by reflecting the shape of a pipe.

In the case that the baffle is designed according to the shape of a pipe as in the known techniques, it is required to install the baffle in all regions that the pipe may be expanded or deflected to occur the flow deviation of fluid therein flow deviation. That is, pipes being subject to large deformation need the install of many baffles for the purpose of minimizing the flow deviation in the pipes. Also, such a design of the baffles is not proper to improve the flow deviation that has been already generated in the pipe.

BRIEF DESCRIPTION OF THE DRAWINGS

FIG. 1a shows a cross-section of baffle members according to one embodiment of the present invention and passage, FIG. 1b is an enlarged view of FIG. 1a, and FIG. 1c is a 3-dimensional view of FIG. 1a.

FIGS. 2a to 2c show flow deviations before and after the baffle members of FIG. 1a is equipped.

FIG. 3a shows cross-sections of baffle members and a part of a passage according to other embodiment of the present invention, and FIG. 3b is a 3-dimensional view of FIG. 3a.

DETAILED DESCRIPTION OF THE INVENTION

Technical Problem

The present invention is designed to improve a flow deviation in regions that the flow deviation occurs, and thus it is an aspect of the present invention to provide a configuration that a distance between baffles is varied depending on the velocity of fluid in the deviation-occurring regions, making the uniform velocity of the fluid passing through the baffles.

Technical Solution

In order to accomplish the above aspect, the present provides a baffle apparatus for improving a flow deviation of a fluid due to the enlargement of a flow cross-section of the fluid, the baffle apparatus comprising a plurality of baffle members, wherein each of the plurality of baffle members has a first part into which the fluid enters and a second part from which the fluid flows out, the first part and the second part being integrated, wherein the first part of each of the plurality of baffle members is at a position where the flow cross-section of the fluid is enlarged and the second part of each of the plurality of baffle members is at the position where the flow cross-section of the fluid is constant, and wherein ends of the first parts of the plurality of baffle members are spaced apart from each other by a distance satisfying the following Equation (1), $$d_i = \frac{D}{f(i)\sum_{i=1}^{n}\frac{1}{f(i)}},\quad (1)$$

wherein i is an integer of 1 to n, n is the number of the baffle members, f(i) is the velocity of fluid in the i-th baffle member, and D is a width of the part that the flow cross-section is constant and wherein the second parts of the plurality of baffle members are spaced apart from each other by a uniform distance.

In the baffle apparatus for improving a flow deviation according to the present invention, the flow cross-section of the fluid may be horizontally and the plurality of baffle members may be vertically extended.

Alternatively, the flow cross-section of the fluid may be enlarged vertically and the plurality of baffle members may be horizontally extended in the present invention.

The flow cross-section of the fluid may be enlarged vertically and horizontally and the plurality of baffle members may be in the form of a grid.

Also, the baffle apparatus for improving a flow deviation according to the present invention may be equipped in a front end of an ammonia injection grid (AIG) of a heat recovery steam generator (HRSG), wherein the baffle apparatus may be spaced apart from a catalytic layer of the HRSG by a predetermined distance.

In addition, the baffle apparatus for improving a flow deviation according to the present invention may be equipped in the front end of the AIG of a selective catalytic reduction (SCR) system, wherein the baffle apparatus may be spaced apart from the catalytic layer of the SCR system by a predetermined distance.

Advantageous Effects

According to the present invention, a distance between baffles is varied depending on the velocity of fluid in the deviation-occurring regions, from which the velocity of fluid passing through the baffles can be uniform overall.

Best Mode

Hereinafter, the baffle apparatus for improving a flow deviation, which comprises a plurality of baffle members, according to one embodiment of the present invention will be described in detail with reference to the accompanying drawings which illustrate a preferable example of the present invention for the purpose of better explanation, not intended to limit the technical scope of the invention.

Also, the same reference numerals, unless otherwise stated, are used to denote the same or equivalent elements, components or parts illustrated in the drawings, and the repeated explanation thereof will be omitted. In addition, the size and shape of each element, component or part in the drawing may be shown in an enlarged or reduced scale for the sake of convenience.

The baffle apparatus of the present invention is to improve a flow deviation of a fluid due to the enlargement of a flow cross-section of the fluid, and comprises a plurality of baffle members. Each of the plurality of baffle members has a first part into which a fluid enters and a second part from which the fluid flows out, the first part and the second part are integrated. The first part of each of the plurality of baffle members is at the position where the flow cross-section of the fluid is enlarged and the second part of each of the plurality of baffle members is at the position where the flow cross-section of the fluid is constant, and wherein ends of the first parts of the plurality of baffle members are spaced apart from each other by a distance satisfying the following Equation (1):

$$d_i = \frac{D}{f(i)\sum_{i=1}^{n}\frac{1}{f(i)}} \quad (1)$$

wherein i is an integer of 1 to n, n is the number of the baffle members, f(i) is the velocity of fluid in the i-th baffle member, and D the width of the part that the flow cross-section is constant and wherein the second parts of the plurality of baffle members are spaced apart from each other by a uniform distance.

In the baffle apparatus for improving a flow deviation according to the present invention, the flow cross-section of the fluid may be horizontally and the baffle members may be vertically extended.

Alternatively, the flow cross-section of the fluid may be enlarged vertically and the plurality of baffle members may be horizontally extended in the present invention.

The flow cross-section of the fluid may be enlarged vertically and horizontally made and the plurality of baffle members may be in the form of a grid.

Also, the baffle apparatus for improving a flow deviation according to the present invention may be equipped in the front end of the ammonia injection grid (AIG) of a heat recovery steam generator (HRSG), wherein the baffle apparatus may be spaced apart from the catalytic layer of the HRSG by a predetermined distance.

In addition, the baffle apparatus for improving a flow deviation according to the present invention may be equipped in the front end of the AIG of a selective catalytic reduction (SCR) system, wherein the baffle apparatus and may be spaced apart from the catalytic layer of the SCR system i by a predetermined distance.

Embodiments

FIG. 1a shows a cross-section of a baffle apparatus 1 for improving a flow deviation of fluid which comprises a plurality of baffle members according to one embodiment of the present invention. FIG. 1a shows one embodiment that fluid flows from right side to left side, specifically the fluid enters a right inlet of a passage 100 and it flows the passage 100 whose cross-section is enlarged and then constant. The baffle apparatus 1 for improving a flow deviation may be installed in a region whose cross-section is enlarged and then constant, as represented by a dotted line in FIG. 1a.

FIG. 1b is an enlarged view of the region represented by a dotted line FIG. 1a. When the fluid enters the passage 100 and flows through the enlarged part 100a of the passage 100 to the part 100b that the flow cross-section is constant, the fluid flow becomes ununiform in the absence of the baffle apparatus 1 for improving a flow deviation which comprises a plurality of baffle members (see FIG. 2a). However, as shown in FIGS. 1a and 1b, the baffle apparatus 1 for improving a flow deviation according to the present invention is installed in the part that the flow cross-section of the passage 100 is enlarged and then constant, thereby improving a flow deviation (see FIG. 2c).

Specifically, the baffle apparatus 1 for improving a flow deviation according to the present invention comprise n baffle members ($10_1, 10_2, \ldots, 10_n$). The box represented by the dotted line in FIG. 1b shows one ($10_i$) of n baffle members. The baffle member ($10_i$) (wherein, i is an integer of 1 to n) consists of a first part ($10_{a,i}$) and a second part ($10_{b,i}$), which are an integrated form. The first part ($10a,i$) of each of the plurality of baffle members is at the position (100a) where the flow cross-section of the passage is enlarged and the second part ($10_{b,i}$) of each of the plurality of baffle members is at the position (100b) where the flow cross-section of the passage is constant.

In the baffle members, a distance ($d_i$) between ends of the respective first parts ($10_{a,i}$) (wherein, i is an integer of 1 to n) may be determined depending on the velocity of fluid in the point that each of the baffle members is located, as follows:

$$d_i = \frac{D}{f(i)\sum_{i=1}^{n}\frac{1}{f(i)}} \quad (1)$$

wherein i is an integer of 1 to n, n is the number of the baffle members, f(i) is the velocity of fluid in the i-th baffle member, and D is a width of the part (100b) that the flow cross-section is constant.

Meanwhile, distances between the respective second parts ($10_{b,i}$) (wherein, i is an integer of 1 to n, and n is the number of the baffle members) of each of the baffle members are the same.

The fluid entering the right inlet of the passage 100 moves to the part 100a that the flow cross-section of the passage is enlarged and flows into between the respective first parts ($10_{a,i}$) of each of the baffle members ($10_i$) of the baffle apparatus 1 for improving a flow deviation and flows from between respective second parts ($10_{b,i}$) of each of the baffle members ($10_i$), and then flows the part 100b that the flow cross-section of the passage 100 is constant. Thereby, the fluid flowing through the baffle apparatus 1 for improving a flow deviation can be surprisingly improved in a flow deviation as shown in FIG. 2c which will be described below, and eventually the fluid can pass through the catalytic layer 100c of the passage 100 of FIG. 1a in the state that the deviations of flow rate, temperature and the like of the fluid are minimized.

FIG. 1c is a perspective view that 3-dimensionally shows the baffle apparatus 1 for improving a flow deviation, which comprises a plurality of baffle members as shown in FIG. 1b, and the passage 100. In FIG. 1c, the flow cross-section of the passage is horizontally enlarged when seeing the part 100a that the flow cross-section of the passage is enlarged, and each of the baffle members ($10_i$) (i is an integer of 1 to n, and n is the number of the baffle members) is shown as the form of being vertically extended. But the present invention is not limited thereto. Alternatively, the flow cross-section of the fluid may be vertically enlarged while the baffle members may be horizontally extended in the present invention, and any other change or modification can be made according to the directions that the flow cross-section is enlarged.

In addition, the total number of the baffle members may be varied according to the environments that the present invention is implemented; and the more the number of baffle members increases, the better the effect of improving a flow deviation increases, as far as the fluid flow is not interrupted. In one embodiment relating to a heat recovery steam generator which may be implemented by the present invention, when the part 100b that the flow cross-section of the passage is constant has a width (D) of 4000 to 5000 mm, the total number (n) of the baffle members may be preferably 80 to 100. Also, when the passage has a height of 9000 mm to 1000 mm in the heat recovery steam generator, the number of the baffle members may be preferably 180 to 200. The baffle members may be made of stainless steel, preferably A240 TP310 being austenite stainless steel.

FIG. 2a shows the ununiform flow of fluid which enters the passage in the absence of the baffle apparatus 1. FIG. 2b is a graph showing the velocity of fluid according to the positions represented by the full line. The graph shows that the velocity of fluid according to the positions is ununiform, and the velocity may be applied to Equation 1 to determine the distance ($d_i$) between the ends of the respective first parts ($10_{a,i}$) of each of the baffle members in the baffle apparatus 1 for improving a flow deviation according to the present invention. FIG. 2c shows the flow deviation improved by the installment of the baffle apparatus 1 for improving a flow deviation according to the present invention in the passage 100 of FIG. 1a.

FIG. 3a shows a cross-section of the baffle apparatus 1' for improving a flow deviation, which comprises a plurality of baffle members, according to other embodiment of the present invention. FIG. 3b is a 3-dimensional view of FIG. 3a. FIG. 3a also shows that fluid flows from right side to left side, specifically the fluid enters a right inlet of a passage 100' and it flows the passage 100' whose cross-section is enlarged and then constant. Referring to FIG. 3b, the flow cross-section is be vertically and horizontally enlarged, unlike FIG. 1c. In this case, the baffle apparatus 1' for improving a flow deviation may be in the form of a grid, and Equation 1 may be used to determine a distance between grids of the respective first parts of baffle members ($10_i$, $10_j$) located in the part that the flow cross-section of the passage 100' is enlarged, similar to FIG. 1b. Specifically, a horizontal distance ($D_{hor}$) of the part that the flow cross-section of the passage 100' is constant may be used to determine a horizontal distance between grids ($d_{hor,i}$) (wherein, i is an integer of 1 to n, and n is the number of the baffle members), and a vertical distance ($D_{ver}$) of the part that the flow cross-section of the passage 100' is constant may be used to determine a vertical distance between grids ($d_{ver,i}$) (wherein, i is an integer of 1 to n', and n' is the number of the baffle members). Meanwhile, the present invention is not limited thereto, and any other change or modification in the overall shape of the baffle members can be made according to the directions that the flow cross-section is enlarged. In this case, Equation 1 may be used to determine a distance between each of the baffle members. Similar to FIG. 1b, the horizontal distances between the respective second parts of the baffle members located in the position that the flow cross-section of the passage 100' is constant are the same, and the vertical distance thereof are the same.

The baffle apparatus for improving a flow deviation, which comprises a plurality of baffle members, according to the present invention may be equipped in the front end of the ammonia ($NH_3$) injection grid (AIG) of a heat recovery steam generator (HRSG) or a selective catalytic reduction (SCR) system or any other apparatus, wherein ammonia may be mixed with fluid passing through the baffle members. When the fluid passes through a catalytic layer, the temperature and velocity of the fluid and the distribution of ammonia in the fluid can be uniform in the front end of the catalytic layer.

Also, the baffle apparatus for improving a flow deviation, which comprises a plurality of baffle members, according to the present invention may be installed in various space environments that fluid flows it through and its flow cross-section is enlarged, including a pipe and a reactor chamber, without any limitations.

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

EXPLANATION OF REFERENCE NUMERALS 1, 1': Baffle apparatus
$10_i$, $10_j$: Baffle member
$10_1$, $10_2$ ... $10_n$: Baffle members
$10_{a,i}$: First part of an individual baffle member
$10_{b,i}$: Second part of an individual baffle member
100, 100': Passage
100a: Part that flow cross-section is enlarged
100b: Part that flow cross-section is constant
100c: Catalytic layer
$d_i$: Distance between ends of the respective first parts of each of the baffle members
D: Width of part that flow cross-section is constant
$d_{hor,i}$: Horizontal distance between the respective first parts of each of the baffle members
$d_{ver,i}$: Vertical distance between the respective first parts of each of the baffle members
$D_{hor}$: Horizontal length of part that flow cross-section is constant
$D_{ver}$: Vertical length of part that flow cross-section is const

What is claimed is:

1. A baffle apparatus for improving a flow deviation of a fluid due to the enlargement of a flow cross-section of the fluid,
which comprises the baffle apparatus comprising a plurality of baffle members,
wherein each of the plurality of baffle members has a first part into which a fluid enters and a second part from which the fluid flows out, the first part and the second part being integrated,
wherein the first part of each of the plurality of baffle members is at a position where the flow cross-section of the fluid is enlarged and the second part of each of the plurality of baffle members is at the position where the flow cross-section of the fluid is constant, and
wherein ends of the first parts of the plurality of baffle members are spaced apart from each other by a distance satisfying the following Equation (1)

$$d_i = \frac{D}{f(i)\sum_{i=1}^{n}\frac{1}{f(i)}} \tag{1}$$

wherein i is an integer of 1 to n, n is the number of the baffle members, f(i) is the velocity of the fluid in the i-th baffle member, and D is a distance of the part that the cross section of the fluid flow is constant, and wherein the second parts of the plurality of baffle members are spaced apart from each other by a uniform distance.

2. The baffle apparatus for improving a flow deviation according to claim 1, wherein the flow cross-section of the fluid is enlarged horizontally and the plurality of baffle members are vertically extended.

3. The baffle apparatus for improving a flow deviation according to claim 1, wherein of the flow cross-section of the fluid is enlarged vertically and the plurality of baffle members are horizontally extended.

4. The baffle apparatus for improving a flow deviation according to claim 1, wherein the flow cross-section of the fluid is enlarged vertically and horizontally and the plurality of baffle members are in the form of a grid.

5. The baffle apparatus for improving a flow deviation according to claim 1, which is equipped in a front end of an ammonia injection grid of a heat recovery steam generator wherein the baffle apparatus is spaced apart from a catalytic layer of the heat recovery steam generator by a predetermined distance.

6. The baffle apparatus for improving a flow deviation according to claim 1, which is equipped in the front end of an ammonia injection grid of a selective catalytic reduction system, wherein the baffle apparatus is spaced apart from a catalytic layer of the selective catalyst reducing system in a predetermined distance.

* * * * *